United States Patent [19]
Conoval

[11] Patent Number: 4,703,511
[45] Date of Patent: Oct. 27, 1987

[54] WRITING INPUT AND DYNAMICS REGENERATION DEVICE

[76] Inventor: Paul Conoval, 2260 Cedar Cove Ct., Reston, Va. 22091

[21] Appl. No.: 917,214

[22] Filed: Oct. 9, 1986

[51] Int. Cl.$^4$ .................. G06K 9/00; G01D 15/10
[52] U.S. Cl. ........................... 382/13; 346/76 PH; 382/11; 382/56; 382/3
[58] Field of Search ............... 382/3, 11, 13, 56, 57, 382/60, 54, 65; 346/111, 76 PH, 76 R; 178/18-20; 340/706, 707, 708, 825.34; 400/120; 101/21, 31

[56] References Cited

U.S. PATENT DOCUMENTS

| | | | |
|---|---|---|---|
| 3,376,551 | 4/1968 | Armbruster | 340/172.5 |
| 3,835,453 | 9/1974 | Narayanan | 340/146.3 SY |
| 4,070,649 | 1/1978 | Wright, Jr. | 340/146.3 SY |
| 4,156,911 | 5/1979 | Crane et al. | 382/3 |
| 4,345,239 | 8/1982 | Elliot | 340/146.3 SY |
| 4,433,436 | 2/1984 | Carnes | 382/3 |
| 4,475,240 | 10/1984 | Brogardh et al. | 382/59 |
| 4,484,200 | 11/1984 | Tabata et al. | 346/76 P H |
| 4,491,856 | 1/1985 | Hayashi et al. | 346/76 P H |
| 4,513,437 | 4/1985 | Chainer et al. | 382/3 |
| 4,518,971 | 5/1985 | Endo | 400/120 |
| 4,555,714 | 11/1985 | Takanashi et al. | 346/76 P H |
| 4,568,817 | 2/1986 | Leng et al. | 376/76 P H |
| 4,581,482 | 4/1986 | Rothfjell | 382/3 |

FOREIGN PATENT DOCUMENTS 58-212970  10/1983  Japan .................. 346/76 P H

OTHER PUBLICATIONS

CODEC Convolutional Coder, Viterbi Decoder STI-5268 Stanford Telecommunications, Inc.
Cyclotomics Inc. Product Information.

*Primary Examiner*—Leo H. Boudreau
*Assistant Examiner*—Joseph Mancuso

[57] ABSTRACT

A handwriting input method and apparatus for recreating handwriting dynamics. A time dependent code is first embedded in the writing path then later, after-the-fact, said code is detected by processing a digital representation of the writing image. Writing coordinates vs. associated time is decoded therefrom. After-the-fact writing position, velocity, and acceleration is derived from this data which can then be further processed by handwriting recognition and signature authentication devices. A code generating stylus is used to modify writing indicia by modulation of the writing markings thereby embedding time code information within the writing path. The modulated writing is generally uniform when viewed macroscopically but microscopically the embedded code becomes perceivable.

17 Claims, 7 Drawing Figures

WRITING INPUT AND DYNAMICS REGENERATION DEVICE

BACKGROUND

The following disclosed invention relates to the art of handwriting recognition, signature identification and specifically to handwriting input devices.

The invention further relates to the art of generating writing and determining dynamics information thereof.

The invention still further relates to the art of automatically converting written text into handwriting dynamics information for use in handwriting recognition and signature authentication devices.

Automatic recognition of handwriting is a different problem due to the wide variability of appearance, registration, interrelationship between letters, and style differences between individuals. Attempts have been made to reduce the variability of written characters by identifying and extracting certain features which can be more easily associated with each letter. Other methods relying on the dynamics of the handwriting are used by including stylus to paper velocity and acceleration information in order to derive a better estimate of the character signal.

Many prior art handwriting recognition and signature authentication devices use dynamics information generated from a simultaneous writing apparatus. Such apparatus generally transmit signals associated with the writing such as stylus direction, velocity, or acceleration and largely depend on some physical paramter which stimulates an appropriate transducer. For example, U.S. Pat. No. 4,513,437 uses axial pressure of pen tip, U.S. Pat. No. 4,345,239 depends on acceleration related capacitance and U.S. Pat. No. 4,475,240 optically senses writing direction.

All of these devices derive dynamics dependent information by indirect means and they are limited to inexact approximations or ambiguous results. For example pen tip axial pressure will generate a signal even if the stylus is stationary, direction sensing will not indicate velocity or acceleration, and accelerometer type devices are not sensitive enough to accurately indicate the subtle changes in handwriting velocity. Furthermore, prior art stylus input devices discard much useful information since they are responsive only to a small number of handwriting parameters.

The present invention does not suffer from any of these limitations since a complete record of all spatial and dynamics information of writing is maintained and recorded by the disclosed method and apparatus without any loss of information. It has a greatly improved accuracy and lends itself to a much higher degree of reliability when used in combination with handwriting recognition and signature authentication algorithms.

Other more conventional means of writing input involve two-dimensional array devices such as x-y tablets, light pens in combination with CRT and the like for determining stylus position and dynamics. Most of these devices require direct connection to the handwriting processors and are cumbersome and costly. Furthermore, access to handwriting recognizers and signature authenticators are restricted to a collocation of input device and processor thereby limiting the number of users.

The present invention provides for a simple, small and portable input device allowing for practical remote use without the restriction of processor collocation.

The present invention discloses a method and apparartus for converting handwriting to writing dynamics information by using a code generating stylus for writing on a surface. Said code generating stylus modifies writing indicia by modulation of the writing markings thereby embedding time code information within the writing path. The writing image including the embedded code is then optically scanned, after-the-fact, resulting in a digital representation of the writing image. The digitized image is processed by resolving the spatial data back into the dynamics of orthogonal vertical and horizontal components by interpretaion of the code embedded in the writing.

The dynamics information together with the spatial image data can then be further processed by one of the multitude of pattern recognition/handwriting authentication analysis methods.

The disclosed device can also be used for recognition of uniquely defined symbols or for the recreation of the time sequence of isolated writing strokes for use as input control. For example, if said code generating stylus embeds time dependent code in the writing, successive strokes on a printed surface can be recreated in its originally written order. Writing strokes included on a page having menu commands or characters printed thereon can be used to recreate said menu sequence by associating the time/position of the stroke with the particular menu item. The detected command or character order could then be reproduced time sequentially.

A variation of the embedded time code allows for error detection and correction by providing the data with redundancy in accordance with one of the many methods known to those skilled in the art of error control coding (ECC).

Other variations of the present invention allow for embedding information other than time in the writing. Sensors built into the writing device can detect physical features of the user such as finger size, pulse rate, etc. for improving signature authentication reliability. Other information such as account numbers may be included in the embedded code such that a written signature may be cross referenced against user information.

A novel feature of the present invention is the ability of the system to ascertain the dynamic information from the writing after the writing is completed so that the only apparatus required in the writing process is the code generating stylus which lends itself to small size, portability, and versatility. The invention allows for conventional writing with the code generating stylus, the markings of which could then be later converted to typewritten text. The device would enable large numbers of users in an office environment to obtain typewritten papers directly from handwritten drafts without direct access to the handwriting processor. In field applications where access to a typewriter is impractical the present invention would serve as a pen size input device effectively producing the same results as a typewriter when the writing is later processed as disclosed.

SUMMARY OF INVENTION

It is an object of this invention to provide a remote handwriting input method and apparatus from which handwriting dynamics can be reconstructed.

It is a further object of this invention to provide a method and apparatus for recreating handwriting dynamics information, after-the-fact, by embedding time dependent information in the writing path which can later be detected by sensing means.

It is a further object of this invention to provide a handwriting input device for handwriting recognition and signature authentication processing.

It is another object of this invention to provide a small, compact, portable, and inexpensive means for writing which could reliably be converted to typewritten text.

It is still a further object of this invention to provide a means for including embedded information other than time within the writing path and for detection of said information.

It is yet another object of this invention to provide an input means by producing markings containing embedded time information therewithin on a surface having preprinted commands or characters thereon, then reconstructing command sequence by associating time of marking with said command or character.

The above objects and other objects inherent in the present invention will become more apparent when read in conjunction with the following specifications and drawings.

Principle of Operation

Figure 1:
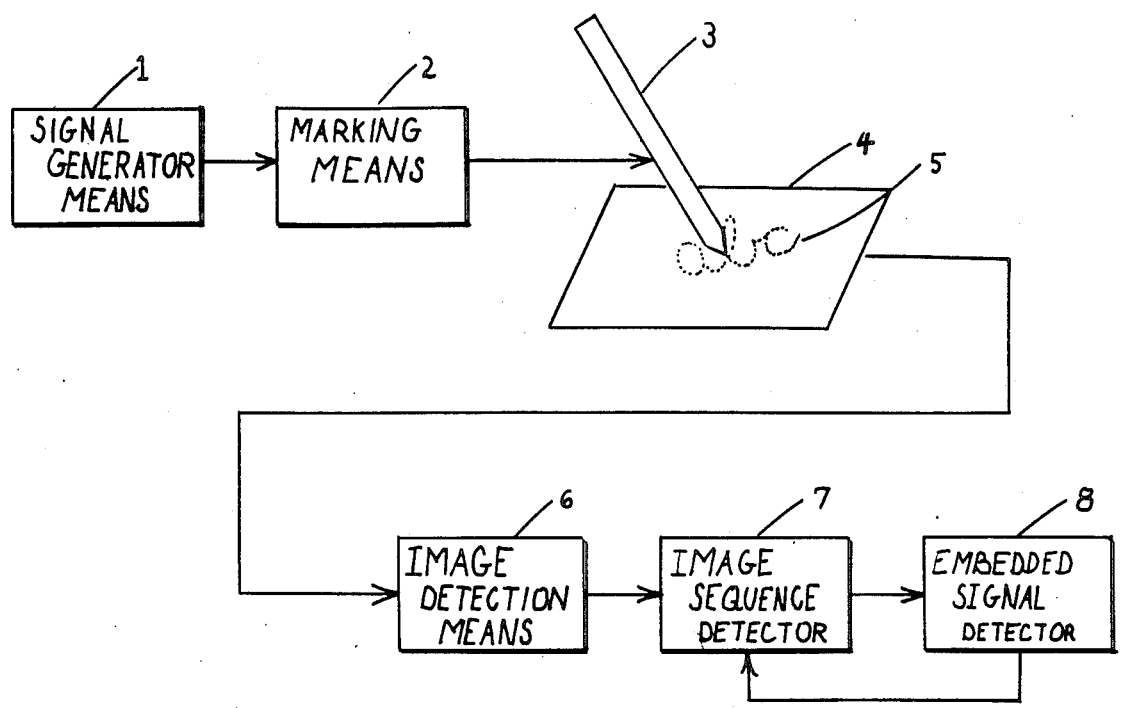
FIG. 1 is a functional block diagram of the handwriting input system illustrating means for producing modulated writing and image detection and processing means.

Writing dynamics information is generally lost after ordinary writing is transmitted to a surface resulting in a two dimensional spatial image representation. This invention discloses a method and apparatus for generating writing indicia and retrieving dynamics therefrom.

Writing markings are herein generated by modulating the handwriting with a time dependent signal thereby producing visible writing containing an embedded time code residing in the writing path. Macroscopically the writing markings appear to be generally uniform but microscopically the embedded time signal becomes perceivable.

The time information at each particular marking in the writing is associated with the spatial position of the said marking itself. This time versus position relationship suffices to recreate the marking sequence as originally written. Dynamics information can be reconstructed therefrom.

Modulation of writing can be implemented in various ways and is analogous to signal modulation over an electrical communication channel. The disclosed code generation stylus is used for writing in the same manner as a conventional stylus producing visible markings on a writing surface. Contained within the markings however, lies the embedded time dependent code.

Modulation of the writing is accomplished by modification of the marking transfers in accordance with said time dependent code. This can be done in either an analog fashion whereby a continuously variable signal influences a parameter of the writing such as intensity, color, localized position, etc. or digitally whereby discrete marking transfers contain the time information.

For the purpose of description, digital modulation of handwriting is described herein, however, the disclosed invention should not be construed as being limited to this embodiment. Many modulation variations, well known to those skilled in the art of electrical communications can effectively satisfy the intent of this invention.

The embedded time signal of the disclosed invention is generated by transmitting a series of pulsed marking transfers conforming to the pattern of a binary time dependent code.

A time dependent binary code can be generated by transmitting a sequence of ones and zeros in a predetermined order such that relative time can be determined by ascertaining the values of a subset of transmitted bits. Such a sequence having this property is a Maximal Length Code which can be generated from a linear feedback shift register.

For example, a 15 stage shift register having the 14th and 15th taps combined and fed back to the input will generate a 32,767 bit maximal length sequence. This sequence has the property that the binary values of any 15 consecutive output bits will occur only once in a particular order. Furthermore, since the sequence output is predetermined, the time period associated with a consecutive 15 bit combination is unique. Time occurrence of an individual bit is calculated by detecting values of adjacent 14 bits thereby forming a 15 bit group then determining time associated with the generation of said bit group.

The Code Generator Pen is implemented by providing a stylus tip with means to deliver an appropriate marking onto a writing surface in accordance with a control signal. Such means are generally related to the art of printing, wherein possible methods comprises the use of electromechanical, electrothermal, or electrostatic printhead devices.

In the present example wherein a binary code is used, no more than two distinguishable markings corresponding to a representation of a binary one and zero respectively are necessary. The two marking elements can be positioed in close proximity to each other on the stylus tip. The selection of either element would place the marking in essentially the same spatial position on the writing surface and contained within the writing path.

The specific markings representing each binary value must be discernably different in order for image detection and processing means to discriminate between respective bit values. Marking differentiation can depend on either size, shape, color, orientation, pattern, etc. and may be as simple as two dots of different diameters as an example.

As an alternative, code generation and writing surface can imply magnetic recording and magnetic media respectively. A light source and photo responsive surface is yet another means.

The above illustrates several methods of implementing a code generating stylus but the present invention is not limited to these means. Any method of transferring a coded sequence on a surface contained with the writing path which is discernible by a responsive detection means is sufficient to accomplish the goals of this invention. The term "image" and "marking" herein does not necessarily imply an optical image and marking but any means of producing a spatial representation of writing comprising optical, magnetic, electrostatic, thermal, etc.

The invention includes scanning the writing image thereby producing an electrical signal representation thereof. As an example, a digital representation of writing image coordinates can be generated by optically scanning a writing surface with a detector responsive to written indicia. Image detector means are known to those skilled in the art and is of similar technology to that commonly found in OCR, facsimile, and computer image input devices.

Processing of the digital image data comprises computing the time occurrence of each detected bit and associating this time with its coordinates obtained from the image scanning process. This is done by first isolating the individual bit markings then determining corresponding binary values from its characteristic appearance. A first estimate of writing path succession is obtained by following the bit markings in order of coordinate continuity by assuming that the shortest spatial distance between neighboring bits follows the time sequence of the writing. This assumption is generally valid since handwriting is essentially linearly continuous and generally composed of noninterferring strokes.

Path decison ambiguity occurs, however, during writing crossovers at which point a choice must be made between a plurality of path possibilities. Also, instances in which the stylus is removed from the surface then returned thereto results in marking sequence discontinuities.

Crossover decision uncertainty is resolved by selection of the path containing the embedded time code conforming to the originally generated sequence. For example, only the correct path will follow the bit value order of the maximal length sequence both before and after the crossover thereby reflecting the time sequence of the writing as originally created.

Discontinuities in detected code sequences are processed as independent markings as would be the case for example in the crossing of the letter "t" or at the start of a new word.

Processing proceeds by storing bit decision values and associated spatial bit coordinates in time ascending order as determined by said first estimate of writing sequence. Time of occurrence of each bit is then determined and appended to the bit decision and spatial coordinate information previously stored. Bit time can be computed for example by collectively determining the values of 15 time adjacent bits contained in the embedded maximal length code and computing the time period thereof as previously discussed.

The bit time/position relationship obtained by this invention is sufficient to reconstruct handwriting as originally generated. Writing dynamics such as velocity and acceleration can also be derived from this information. Computing spatial distance and dividing by time difference between bits results in instantaneous bit velocity. Acceleration is found by dividing the difference in bit velocity by time difference between bits.

DESCRIPTION OF PREFERED EMBODIMENT

Refering to FIG. 1, signal generator means 1 produces a time varying waveform comprising time dependent information. The output of 1 is provided to, and controls marking means 2. Marking means 2, when positioned in close proximity to a responsive surface produces marking indicia thereon, in direct relationship to said time varying waveform. Stylus 3 comprises marking means 2 allowing for mobility thereof. Stylus 3 is configured such that contact between marking means 2 and responsive surface 4 is established. As marking means 2 is directed over responsive surface 4 in accordance with writing, a record of said marking indicia is generated and transferred to surface 4 within the writing path thereby producing writing 5 having said time dependent information embedded therewithin. The writing becomes effectively modulated with said time dependent signal.

After writing is produced, surface 4 is provided to image detection means 6 wherein writing 5 image is converted to an electrical signal representation thereof. The output of 6 comprises coordinate information pertaining to the spatial positions of the marking indicia and has sufficient resolution for the detection of the time varying information embedded in writing 5. The data corresponding to the coordinates of an individual image point will hereinafter be refered to as a pixel.

Linear optical array scanning is generally used in commercially available image detectors whereby pixel data is output in a row by row serial format regardless of the order in which the image was originally generated. Image sequence detector 7 receives and rearranges the output of image detection means 6 thereby producing image coordinate data in order of continuous writing beginning at the initial pixel of a writing segment, then following the path of said segment until the last pixel is reached.

Writing segment is herein defined as writing indicia following an arbitrary spatial path but occuring in a time continuous progression produced by uninterrupted contact of stylus 3 on surface 4. The writing image comprises at least one writing segment but in general a plurality of writing segments is likely to occur.

Image sequence detector 7 operates by determining the initial pixel coordinate of a writing segment, then locating the coordinates of a second pixel in closest proximity to the initial pixel. A third pixel closest to said second pixel is then located etc. until all pixels in a writing segment are exhausted.

The output of 7 is supplied to embedded signal detector 8 which separates the embedded time dependent signal from the writing data which in effect demodulates the writing thereby producing time data associated with the pixel coordinates.

Extracting information embedded in the writing involves the detection of the localized variations of pixel data, the process of which is dependent on the particular method used in modulating the original writing. As described heretofore, the modulation method varies a parameter of the writing such as color, intensity, localized position, shape, size, orientation etc. and can be done using either continuous or discrete modulation. The results of this process essentially reduces the arbitrary two-dimentional configuration of writing to a linear one-dimensional signal wherein the embedded information is separated from the writing. An example of a specific embodiment is hereinafter described in detail.

Pixel time/position data resulting from 8 is fed back to image sequence detector 7 whereby a correct pixel coordinate decision can be made in the event of multiple path possibilities caused by writing crossovers. The succession of neighboring pixels progresses in accordance with time continuity such that only the correct path will result in a relatively small time interval both before and after the crossover.

The processing method as described heretofore operates on each continuous writing segment from begining to end after which another segment can be processed, until all segments have been exhausted. There are no restrictions on writing format or order of segment processing since time associated with each writing segment is independently determined.

Furthermore it is not essential to begin operating on a writing segment from the initial point. An arbitrary start point will progress either forward or reverse in time depending on the initial direction, while still maintaining time continuity.

Figure 2:
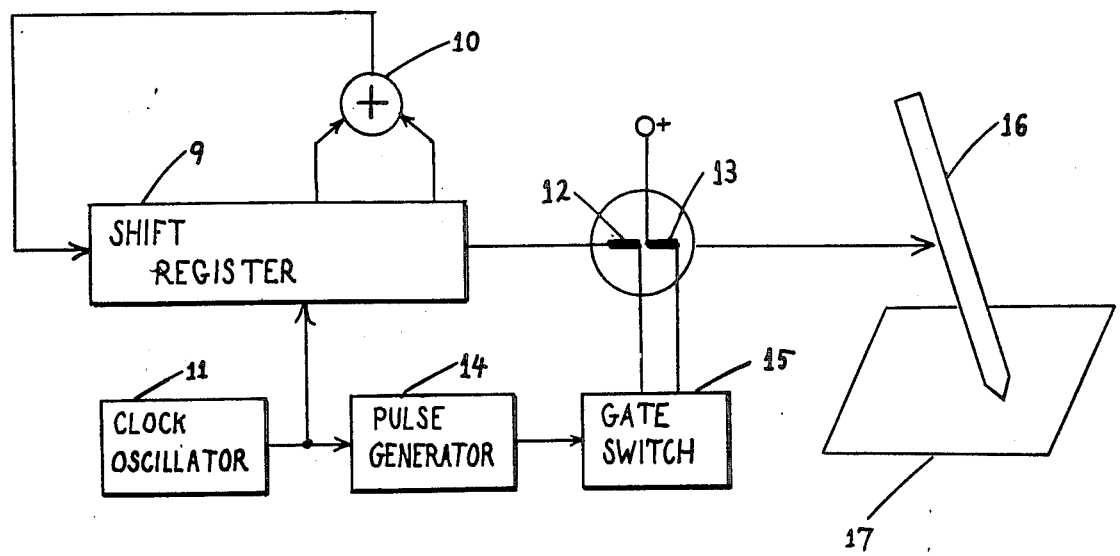
FIG. 2 is a more detailed illustration of time code generation and marking modulation means as described in the prefered embodiment.

FIG. 2 illustrates a detailed embodiment of the writing modulation means wherein time signal generator means 1 of FIG. 1 comprises a digital binary waveform and more specifically a binary maximal length sequence. Marking means 2 is illustrated as a thermal printhead which stimulates thermally responsive paper. The thermal printhead is of similar technology as that commonly found in conventional thermal printers and plotters. These devices comprise a plurality of heat generating elements arranged in a linear array wherein each of the individual heating elements is controlled independently.

A fifteen stage shift register 9 having the fifteenth and fourteenth bits fed back through exclusive-or gate 10 generates a 32,767 bit cycle maximal length sequence upon successive pulses of clock oscillator 11. The output of 9 is supplied to heating element 12 which receives either a high or low signal corresponding to the output bit of shift register 9. Heating element 12 is oriented horizontally as shown and adjacent to a second horizontally oriented heating element 13.

The output of clock oscillator 11 triggers pulse generator 14 during each clock cycle thereby providing a low duty cycle control signal to gate switch 15. Gate switch 15 allows heating element 13 to conduct, and heating element 12 to conduct in accordance with output 9 bit value. Heating elements 12 and 13 generate heat when conducting thereby producing horizontal markings when passed over thermal responsive paper 17. Heating element 13 produces a horizontal marking for each clock cycle whereas adjacent heating element 12 produces an adjacent horizontal marking only during the clock cycles in which a high level is output from 9. This results in either a single or double width marking to be transfered to paper 17 corresponding to a binary zero or one respectively.

Figure 3:
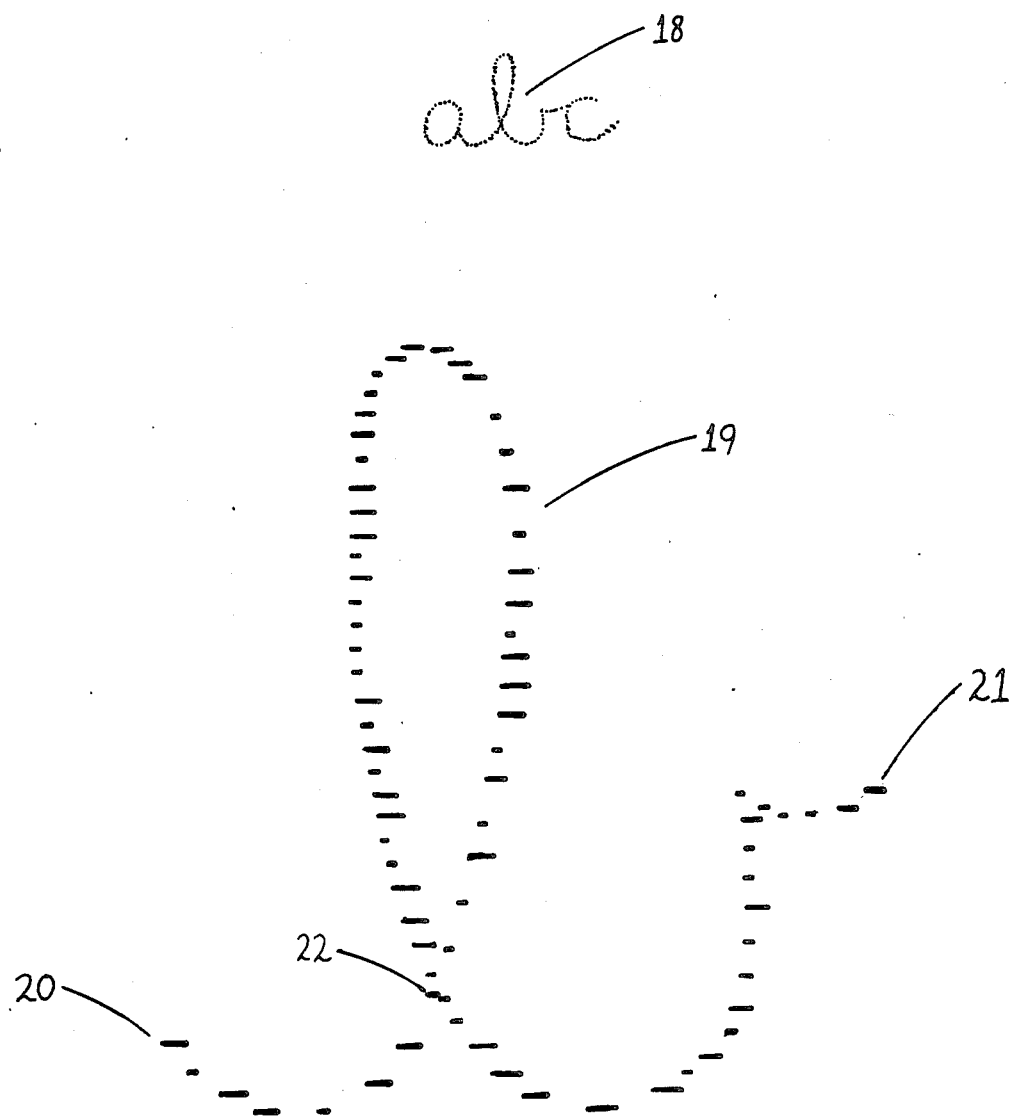
FIG. 3 is an example of writing generated by a particular embodiment of a code generator pen and an expanded view detailing the coded information.

Stylus 16, comprising heating elements 12 and 13 in contact with thermal sensitive paper 17, is directed thereon in accordance with writing thereby producing the indicia illustrated in FIG. 3. Writing 18 is a macroscopic view of the letters "abc" as written with stylus 16 of FIG. 2. Writing 19 is an enlargement of the middle letter "b" of 18 wherein the embedded digital code generated by linear feedback shift register 9 of FIG. 2 becomes perceivable as isolated horizontal markings representing successive bits of the maximal length sequence. The sequence of bits beginning at position 20 progresses continuously to 21 conforming to the pattern of the maximal length sequence.

Knowledge of the successive representations of ones and zeros makes it possible to calculate the time occurrence of the markings so that the original path of the stylus strokes and associated time thereof could be reconstructed as originally written. For example, beginning at position 20 the binary values corresponding to the marking indicia proceeds as 101101100010101 . . . The next bit generated by shift register 9 of FIG. 2 will be the exclusive-or combination of the fourteenth and fifteenth previous bits resulting in a value of 1, followed by a 1 etc. By ascertaining the value of any 15 time contiguous bits it is possible to continue regenerating the maximal length sequence from this point. Successively detected binary bits can be tested against the regenerated sequence to determine the time contiguous path of the writing and to select the correct path at writing crossovers such as position 22 of FIG. 3.

Time of the marking indicia is determined by detecting 15 contiguous bit values then calculating the number of clock cycles from the initialization point of shift register 9 required to produce these values. Assuming a constant bit period clock cycle, the time is determined by multiplication of the number of clock cycles by the bit period of clock oscillator 11 of FIG. 2. An alternative to computing the number of clock cycles required to reach a certain point involves the use of a look-up table whereby a 15 bit value can be mapped directly into time of ocurrrence.

Figure 4:
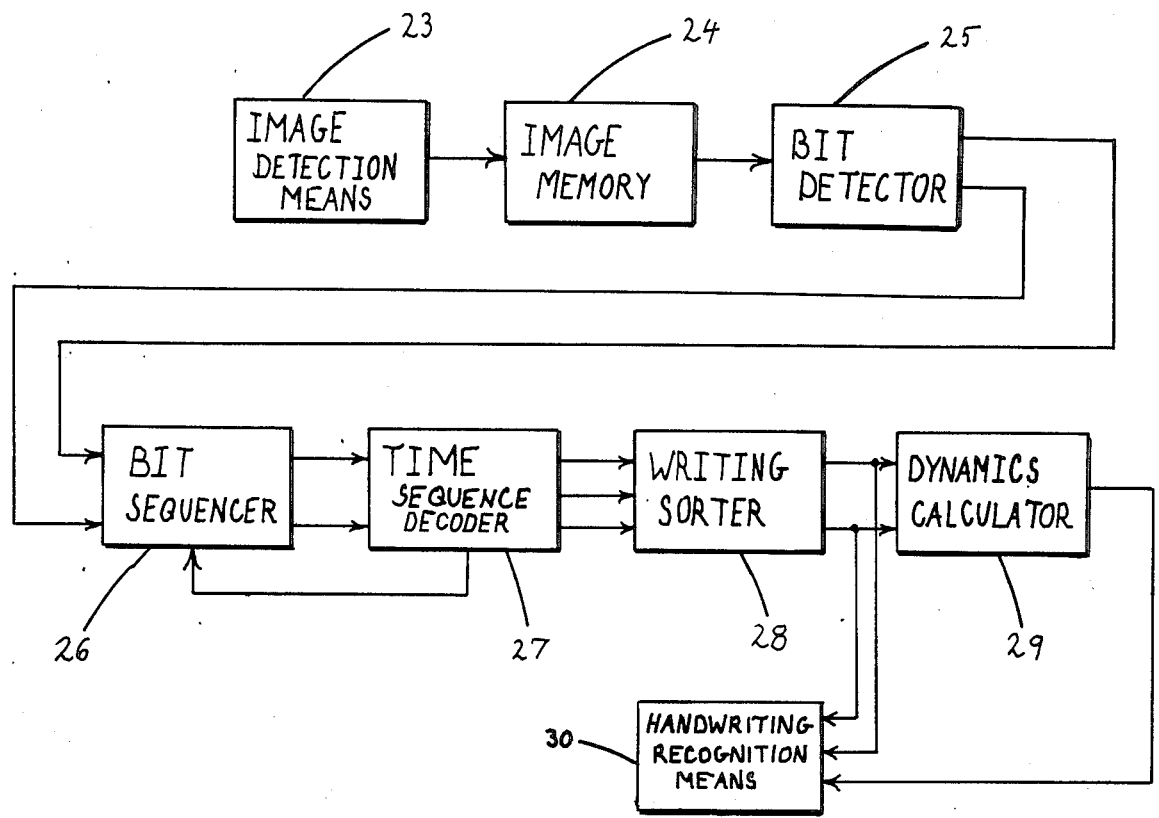
FIG. 4 is a more detailed block diagram of image detection and processing means as described in the prefered embodiment.

Refering to FIG. 4 a more detailed block diagram of the writing image processing is illustrated. Actual implementation of the indicated functions can be done using either microprocessor hardware whereby each function is processed by means of a firmware program, or in dedicated hardware. Both methods are known to those skilled in the art and therefore the description of the prefered embodiment will proceed by reference to the functional block diagram of FIG. 4 without detailing a specific hardware implementation.

Image detection means 23 converts the writing image illustrated in FIG. 3, produced by stylus 16 of FIG. 2 to an electrical signal representation thereof resulting in coordinate data for each pixel corresponding to the writing indicia. Said image coordinate data is transfered to, and stored by image memory 24.

Bit detector 25, supplied with data from 24, isolates individual bit markings then determines its associated binary value. Adjacent pixel coordinates are assumed to be part of the same isolated marking and the number of pixels corresponding to each isolated marking is directly related to the marking width. A single width marking and a double width marking corresponds to a binary zero and one respectively. The output of 25 comprises the detected binary bit value and the coordinate of the leftmost pixel contained in the isolated pixel group used in making the bit decision. A single binary value and single bit coordinate for each of the isolated image markings of FIG. 3 is thereby provided to bit sequencer 26.

Bit sequencer 26 arranges the bit value/coordinate data output of 25 in order of continuous writing beginning at the initial bit of the writing segment, then following the segment path until all bits are exhausted. This is done by determining the initial bit coordinate of the writing segment, then locating the coordinates of a second bit closest in proximity to the initial bit. A third bit closest to said second bit is located, etc. until all bits in a writing segment are exhausted. The output of 26 generally follows the progression of bits as sequentially generated in the writing path. The bit value and associated bit coordinate data is passed on to time sequence decoder 27.

Time sequence decoder 27 determines absolute time associated with the occurrence of each detected bit then appends time data to the bit value and bit coordinate data. For the maximal length sequence used in this description, bit occurrence time is determined by ascertaining the bit vlaues of 14 adjacent bits then collectively determining the number of clock cycles required of maximal length shift register 9 of FIG. 2 to reach this point. Successive detected bit values are herein tested against a regenerated maximal length sequence starting from the detected 15 bit values in order to assure sequence continuity and correct path decisions at writing crossover points.

It is possible that the data supplied to time sequence decoder 27 is received in reverse order from the originally generated sequence. However as successive bits are tested against the regenerated maximal length sequence by 27, errors will occur thereby indicating that the time reversed sequence is being received. Feedback from 27 is supplied to bit sequencer 26 which signals 26 to restart its process by proceeding in the opposite direction in the writing path.

Time sequence decoder 27 provides bit coordinate and bit time data to writing sorter 28 whereby results associated with other writing segments are arranged in time sequential order. The heretofore described processing operates on a continuous writing segment without regard to its relative occurrence time with respect to other independent writing segments. Since time information pertaining to the segment bits are maintained, the original writing sequence involving allwriting segments can be reconstructed. The output of 28 comprises the time sequential arrangement of the writing coordinate data and associated time thereof as originally written.

The output of 28 can be further processed by dynamics calculator 29 wherein writing velocity and acceleration is computer. Herein the distance between spatial coordinates of time consecutive bits are computed and divided by the bit period thereby producing an association between instantaneous velocity of writing and coordinate thereof. The difference in the instantaneous velocity between two consecutive bits divided by the bit time produces an association between instantaneous acceleration of writing and coordinate thereof.

The writing format described heretofore is assumed to occur arbitrarily without specific definition of writing symbols or characters. The present invention recreates writing dynamics from previously written indicia regardless of the generated writing path. Character recognition is possible however if generated writing conforms to a predefined symbol set such as alphanumeric characters or uniquely defined symbols. If writing dynamics data associated with each character is appreciably different, character recognition could be accomplished by mapping writing dynamics data into the associated written character. Many prior art techniques exist for the recognition of handwritten characters using writing dynamics input information.

The present invention is used in combination with handwriting recognition means as illustrated in FIG. 4 wherein the output of writing sorter 28 and dynamics calculator 29 are provided to handwriting recognition means 30. Handwriting recognition means 30 translates the received writing dynamics data into the predefined character associated therewith.

A variation of the present invention provides an input means by producing markings comprising embedded time information on a surface having prearranged commands or characters thereon. The command or character sequence is later recreated by determining the time and position of said markings and associating the corresponding command or character therewith.

Figure 5:
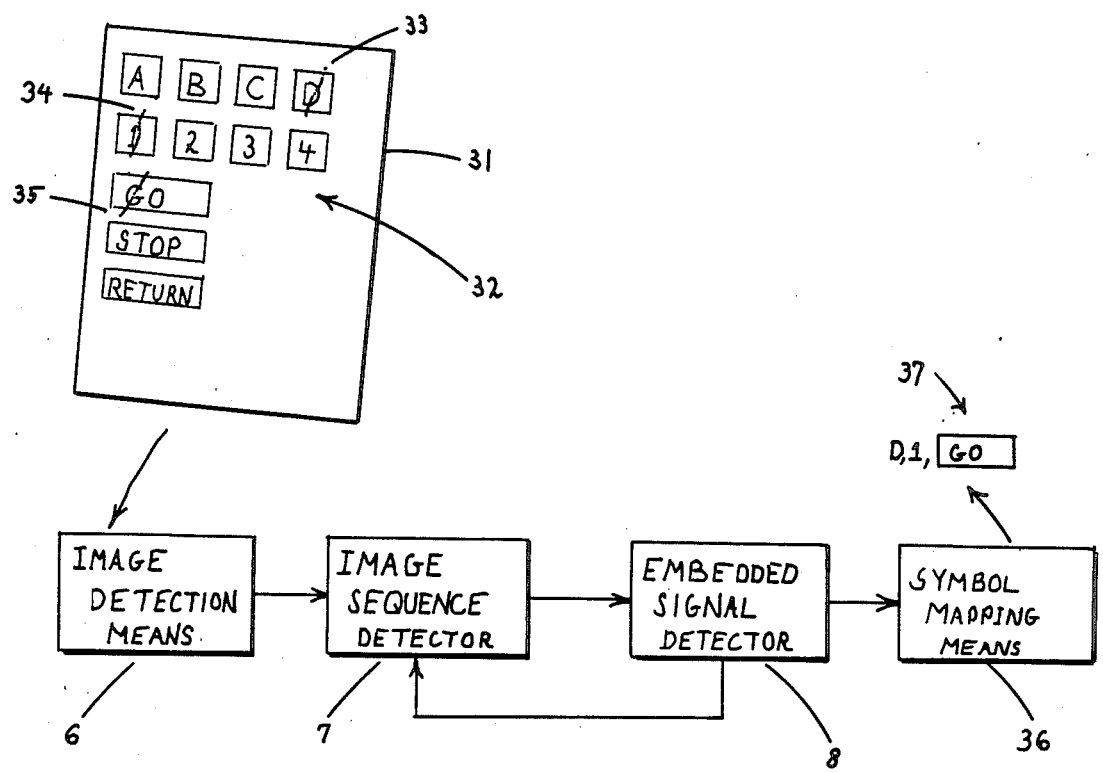
FIG. 5 illustrates a variation of this invention as used for inputting command and character sequences.

Refering to FIG. 5 surface 31 is shown having alphanumeric and command characters 32 arranged thereon. Writing strokes 33, 34, and 35 are generated in time consecutive sequence and comprise time coded information embedded therewithin as generated by stylus 3 of FIG. 1.

Surface 31 is processed in an identical manner to that previously described in FIG. 1 and is repeated in FIG. 5 as image detection means 6, image sequence detector 7, and embedded signal detector 8. Reiterating, the output of 8 produces time data associated with the spatial coordinates of the writing data. The output of 8 is further processed by symbol mapping means 36 wherein the spatial coordinates of each writing segment is translated to the command or character symbol lying therebeneath resulting in a recreation of the time sequence of character/commands. For example the character/command sequence 37 results from respective markings 33, 34, and 35.

A fifteen stage maximal length sequence is used in the heretofore description for relating time dependent information to the writing indicia. This particular choice was made for illustration purposes since the maximal length sequence is suitable for its time determining properties, simplicity of decoding, and its inherent error detection capabilities. Many other codes well known to those skilled in the art of digital communications are suitable for accomplishing the goals of this invention including, but not limited to, other sequences generated by linear recursive shift registers.

Error detection is herein performed by the inherent property that the sequence of detected image bits are somewhat known apriori. For example, as soon as 15 correct contiguous bits are detected from the writing image data, the maximal length sequence can be regenerated. Errors occuring in the subsequent succession of detected bits are easily identified as such whenever the expected values thereof differ from the regenerated sequence. This property is herein exploited in resolving ambiguities in writing path decisions during crossover points, but can also be used to detect extraneous detected bit errors due to erroneous image detection.

In general however, the detection and/or correction of signal errors is known to those skilled in the art as Error Control Coding (ECC) which encompasses many mathematical techniques for improving the error rate properties over signal channels. Two important classes of ECC are known as convolutional and block coding wherein redundancy generated by mathematical manipulation of the original data is included along with the original information.

Many techniques are available for implementing ECC such as simple Hamming codes to more sophisticated Reed Solomon and Viterbi codes, all of which exist in commercially available hardware. Alternately, an ECC algorithm can be implemented as a computer program.

Figure 6:
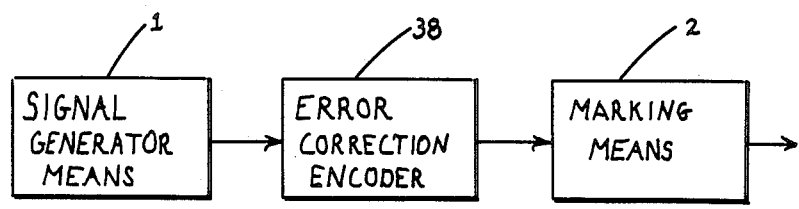
FIG. 6 illustrates the use of error correction encoding and its relationship to signal generator means of FIG. 1.
Figure 7:
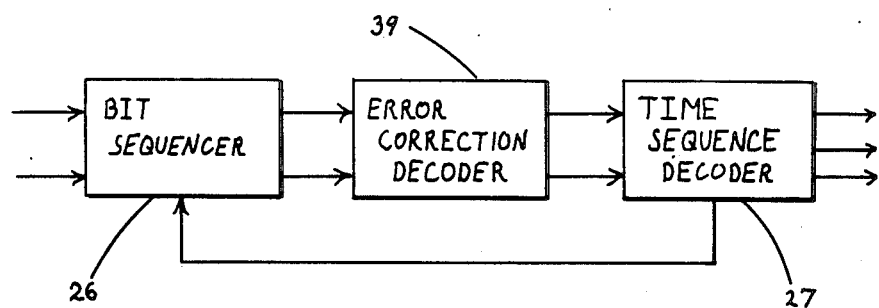
FIG. 7 illustrates the use of error correction decoding and its relationship to the processing of FIG. 4.

A variation of the present invention involves the use of ECC in the generation and detection of the embedded signal data of the written indicia. Error correction encoding operates on the time dependent data in the writing generation process. Error correction decoding is performed on the recovered bit sequential data derived from the writing image before time code detection. The use of ECC encoding and decoding in relation to the heretofore described prefered embodiment, is illustrated in FIGS. 6 and 7 respectively. Signal generator means 1 and marking means 2 of FIG. 1 is redrawn in FIG. 6 illustrating its relationship to ECC encoding. Bit sequencer 26 and time sequence decoder 27 of FIG. 4 are redrawn in FIG. 7 illustrating the relationship between ECC decoding with respect to the writing image processing.

Referring to FIG. 6, a time varying waveform, for example a maximal length sequence, is provided to error correction encoder 38. Error correction encoder 38 modifies the output of 1 by including redundant data therewith in accordance with a particular error correction encoding method thereby producing a redundant time dependent digital signal. This signal is thereafter provided to marking means 2 which produced marking indicia on surface 4 of FIG. 1 resulting in writing markings comprising ECC encoded data.

FIG. 7 illustrates error detection decoding in the context of the processing described in FIG. 4. Error correction decoder 39 is provided with sequential bit values and associated coordinates of the writing image data produced by bit sequencer 26. Error correction decoder 39 performs the inverse operation of error correction encoding whereby received bit errors are detected and corrected in accordance with an appropriate error decoding method. The output of 39 is then provided to time sequence decoder 27 after which processing continues as previously described.

While the invention has been described with reference to certain prefered embodiments thereof, it is understood that the present disclosure has been made only by way of example and that various modifications and other embodiments thereof may be resorted to without departing from the spirit and scope of the invention as hereinafter claimed.

I claim:

1. A writing dynamics input device comprising:
   marking means for producing marking transfers on a surface;
   writing stylus means comprising said marking means adapted for positioning said marking transfers on said surface in a writing path traversed in accordance with writing thereby producing a sequence of said marking transfers on said surface arranged in a configuration corresponding to said writing path, wherein said marking transfer sequence comprises first information manifested in the spatial configuration thereof;
   time code means for generating a time code sequence having output values comprising second information related to advancing time;
   modulation means for modifying a characteristic of said marking transfers in accordance with said time code sequence and simultaneously to the generation of said writing, thereby producing a sequence of modified marking transfers on said surface arranged in said writing path, said modified marking transfer sequence characterized by said first information manifested in said spatial configuration thereof and said second information manifested in said characteristic modifications of said marking transfers therewithin, whereby a time relationship between said marking transfers and said second information is produced, said time relationship relating to the dynamics of said writing.

2. The device of claim 1 wherein said time code sequence comprises a digital time code including a sequence of digital values having subsets therewithin, said subsets comprising at least one of said digital values and including information relating to the time of occurrence of said subsets; and
   said modified marking transfer sequence corresponds to said digital value sequence whereby said modified marking transfer sequence includes segments therewithin, said segments corresponding to said subsets and including information relating to time of generation of said segments.

3. The device of claim 2 wherein said digital value sequence has a predetermined order, said subsets comprise a plurality of said digital values occurring consecutively in said predetermined order, and said segments corresponding to said subsets comprise consecutive marking transfers on said surface in said predetermined order, whereby a relative time difference between said segments can be determined by relating said digital values corresponding thereto to said predetermined order.

4. The device of claim 3 wherein said digital value sequence comprises a recursive sequence and said modified marking transfers comprise discrete marking transfers arranged in said writing path and corresponding to said recursive sequence whereby each of said digital values is dependent on a plurality of previous said digital values thereof.

5. The device of claim 4 wherein said recursive sequence comprises a binary recursive sequence including binary values, said discrete marking transfers comprise a first discrete marking transfer and a second discrete marking transfer representative of said binary values.

6. The device of claim 2 wherein said time code means periodically produces said digital values at a uniform time interval, said modified marking transfers comprise discrete marking transfers corresponding to said digital values produced on said surface at said uniform time interval thereby producing said discrete marking transfers on said surface positioned within said writing path and having a distance between said marking transfers dependent on the velocity of said writing.

7. The invention of claim 1 wherein said stylus means is adapted for handwriting use, said stylus means comprises a tip having said marking means located at said tip such that an interaction between said marking means and said surface is established whereby said stylus means is configured for providing arbitrarily arranged handwriting on said surface.

8. The device of claim 1 further comrprising:
   scanning means for converting said modified marking transfer sequence on said surface to a spatial coordinate representation thereof, said spatial coordinate representation comprising spatial coordinate data;
   processing means for extracting said second information from said spatial coordinate representation thereby producing detected time code data;
   correlation means for relating said detected time code data with said spatial coordinate data associated therewith, thereby producing detected time dynamics information comprising an association between said spatial coordinate data and time of generation thereof.

9. The device of claim 8 further comprising reconstruction means for arranging said spatial coordinate data in accordance with said detected time dynamics informaton thereby producing an arrangment of said spatial coordinate data in the same order as originally produced by said writing.

10. The device of claim 8 wherein said time code sequence comprises a digital time code having digital values, said modulation means comprises means for producing discrete marking transfers on said surface in accordance with said digital time code, and said processing means comprises:
digital detection means for determining said digital values from said spatial coordinate data thereby producing detected digital data values;
data arrangement means for arranging said detected digital data values in a first writing sequential order; and
time decoding means for decoding said second information from the output of said data arrangement means.

11. The device of claim 10 further comprising means for providing feedback from said time decoding means to said data arrangement means thereby producing a revised writing sequential order having a time sequential arrangement.

12. A writing input device comprising:
signal generating means for producing a digital time dependent signal;
marking means for producing discrete markings on a surface in accordance with said digital time dependent signal;
stylus means comprising said marking means for providing movement thereof over said surface in accordance with writing thereby producing coded writing markings on said surface comprising embedded time dependent information therewithin;
first detection means for converting said coded writing markings to a spatial coordinate representation thereof;
second detection means for detecting digital values and coordinates of said discrete markings from said spatial coordinate representation;
data arrangement means for arranging said digital values and said coordinates in writing sequential order thereby producing writing sequential data;
time decoding means for decoding said time dependent information from said writing sequential data thereby producing decoded time data relating the spatial coordinates of said coded writing markings with time thereof; and
feedback means for providing feedback from said time decoding means to said data arrangement means whereby said time dependent information influences said writing sequential order by maintaining time continuity of said writing sequential data.

13. The device of claim 12 wherein said digital time dependent signal comprises a digital sequence having digital values arranged in a predetermined order, said predetermined order corresponding to advancing time information and having a property that said digital values represent the time of occurrence thereof; and said discrete markings correspond to said digital values, and said coded writing markings correspond to said digital sequence arranged on said surface in a spatial configuration corresponding to said writing.

14. The device of claim 12 further comprising correlation means for associating said decoded time data with said writing sequential data thereby producing dynamics data corresponding to the generation of said writing.

15. The device of claim 12 wherein said surface has associated therewith a plurality of predefined areas corresponding to predefined symbols whereby the presence of markings produced in said areas signifies the selection of said symbols corresponding thereto,
said coded writing markings comprise a plurality of isolated writing segments on said surface, produced in a time sequential order at positions corresponding to said predefined areas associated with said symbols,
and wherein said writing sequential data is further processed by symbol mapping means, whereby said coordinates of said writing sequential data coincident with said predefined areas are translated into said symbols, thereby producing output data corresponding to said symbol selections in accordance with said time sequential order of said isolated writing segments.

16. The device of claim 15 wherein said predefined symbols are included as backround indicia on said surface whereby said backround indicia is used for identifying said predefined areas, said symbols comprise alphanumeric characters, and said output data comprises a sequence of alphanumeric characters.

17. A writing input device comprising:
signal generating means for producing a digital time dependent signal;
error correction encoding means for encoding said digital time dependent signal thereby producing a modified digital time dependent signal;
marking means for producing discrete markings on a surface in accordance with said modified digital time dependent signal;
stylus means comprising said marking means for providing movement thereof over said surface in accordance with writing thereby producing coded writing markings on said surface comprising embedded time dependent information therewithin;
first detection means for converting said coded writing markings to a spatial coordinate representation thereof;
second detection means for detecting digital values and coordinates of said discrete markings from said spatial coordinate representation;
data arrangement means for arranging said digital values and said coordinates in writing sequential order thereby producing writing sequential data;
error correction decoding means for processing errors occurring in said writing sequential data, whereby said error correction decoding means corresponds to said error correction encoding means in a related inverse process, thereby producing corrected writing sequential data; and
time decoding means for decoding said time dependent information from said corrected writing sequential data thereby producing decoded time data relating the spatial coordinates of said coded writing markings with time thereof.

* * * * *